(12) United States Patent
Alvanos et al.

(10) Patent No.: US 9,039,364 B2
(45) Date of Patent: May 26, 2015

(54) INTEGRATED CASE AND STATOR

(75) Inventors: Ioannis Alvanos, West Springield, MA (US); Gabriel L. Suciu, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1001 days.

(21) Appl. No.: 13/172,316

(22) Filed: Jun. 29, 2011

(65) Prior Publication Data

US 2013/0000324 A1    Jan. 3, 2013

(51) Int. Cl.
| | |
|---|---|
| F04D 29/44 | (2006.01) |
| F04D 29/54 | (2006.01) |
| F03B 1/00 | (2006.01) |
| F03B 11/02 | (2006.01) |
| F03D 5/00 | (2006.01) |
| F01D 1/02 | (2006.01) |
| F03D 1/04 | (2006.01) |
| F03D 3/04 | (2006.01) |
| F03B 3/16 | (2006.01) |
| F01D 9/04 | (2006.01) |
| F01D 25/24 | (2006.01) |

(52) U.S. Cl.
CPC .............. *F01D 9/044* (2013.01); *F01D 9/041* (2013.01); *F01D 25/24* (2013.01); *F01D 25/243* (2013.01); *F01D 25/246* (2013.01); *F05D 2230/53* (2013.01); *F05D 2300/6033* (2013.01); *Y02T 50/672* (2013.01)

(58) Field of Classification Search
CPC .............. F01D 9/00; F01D 9/02; F01D 9/04; F01D 9/041; F01D 9/042; F01D 9/047
USPC ................. 60/805; 415/200, 191, 193, 209.1, 415/209.2–209.4, 210.1, 208.2, 174.4
See application file for complete search history.

(56) References Cited

U.S. PATENT DOCUMENTS

| | | |
|---|---|---|
| 3,588,267 A | 6/1971 | Wilkinson et al. |
| 4,445,259 A | 5/1984 | Ekbom |
| 5,180,281 A | 1/1993 | Burge et al. |
| 6,991,427 B2 | 1/2006 | Scott |
| 7,520,055 B2 | 4/2009 | Lundgren |
| 7,797,922 B2 | 9/2010 | Eleftheriou et al. |
| 2009/0087309 A1* | 4/2009 | Schreiber ................. 415/200 |
| 2010/0092281 A1* | 4/2010 | Habarou et al. ........... 415/200 |

* cited by examiner

*Primary Examiner* — Craig Kim
(74) *Attorney, Agent, or Firm* — Kinney & Lange, P.A.

(57) ABSTRACT

A gas turbine engine includes a compressor, a combustor section, and a turbine. The turbine includes an integrated case/stator segment that is comprised of a ceramic matrix composite material.

18 Claims, 3 Drawing Sheets

INTEGRATED CASE AND STATOR

BACKGROUND

The present invention relates generally to gas turbine engines, and more particularly to an integrated case and stator vane component in a low pressure turbine of a gas turbine engine.

A gas turbine engine typically includes a high pressure spool, a combustion system and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. The combustion system is disposed between the high pressure compressor and the high pressure turbine and receives compressed air from the compressors and fuel provided by a fuel injection system. A combustion process is carried out within the combustion system to produce high energy gases to produce thrust and turn the high and low pressure turbines, which drive the compressors to sustain the combustion process.

Compressors and turbines are comprised of alternating stages of blades and vanes that are arranged radially around a center axis of the engine within the axial flow path of the engine case. For example, in the low pressure turbine, blades are connected to the low pressure shaft such that they rotate about the engine centerline, while vanes are supported by the engine case such that they remain stationary between the blades. Traditionally, the hooks have been used to attach vanes individually or in small clusters. Not only do these hooks provide thermal mechanical fatigue and low cycle fatigue cracking areas due to the complex machined features, but the gaps between the vanes or vane clusters provide leakage pathways that can lower engine efficiency and can cause thermal hot-spots on the engine case.

SUMMARY

According to the present invention, a gas turbine engine includes a compressor, a combustor section, and a turbine. The turbine includes an integrated case/stator segment that is comprised of a ceramic matrix composite material.

In another embodiment, an integrated case/stator segment for a gas turbine engine includes a case section, a box structure section and a vane airfoil section. The case section is cylindrical about an axis. The box structure section extends radially inward from the case section and includes two radial supports and an outer ring that extends between the radial supports. The vane airfoil section extends radially inward from the outer ring. The case section, the box structure section, and the vane airfoil section comprise a single integrated component.

In another embodiment, an integrated case/stator assembly for a gas turbine engine includes a first integrated case/stator segment and a second integrated case/stator segment. The first and second integrated case stator segments are comprised of a ceramic composite material and are formed to be a single integrated component.

DETAILED DESCRIPTION

Figure 1:
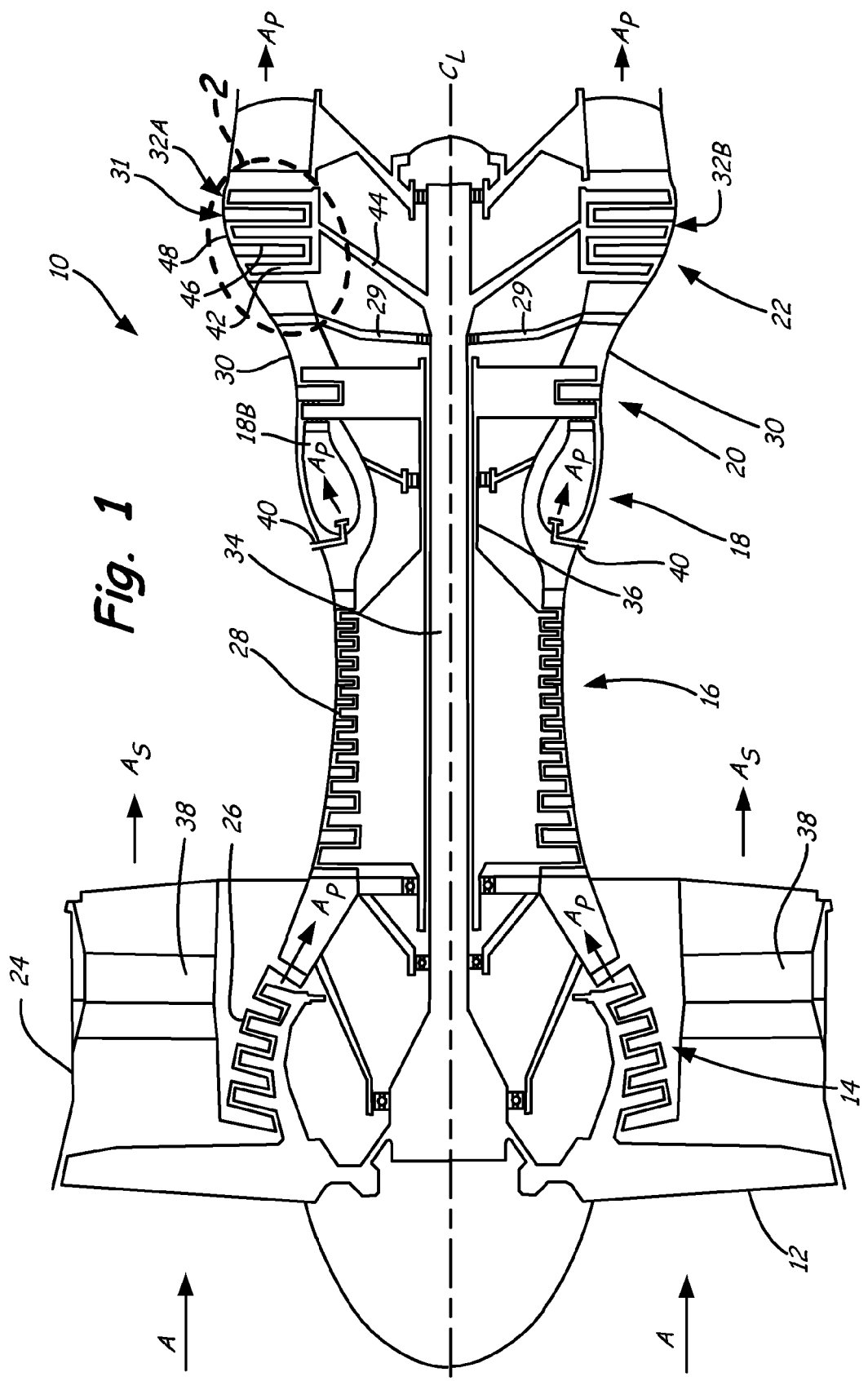
FIG. 1 is a schematic side cross-section view of a gas turbine engine.

FIG. 1 shows a cross section of gas turbine engine 10 in which an integrated case and stator vane component is used. Although FIG. 1 depicts a gas turbine engine typically used for aircraft propulsion, the invention is readily applicable to gas turbine generators and other similar systems incorporating rotor-supported, shaft-driven turbines. Shown in FIG. 1 are gas turbine engine 10, fan 12, low pressure compressor (LPC) 14, high pressure compressor (HPC) 16, combustor section 18, high pressure turbine (HPT) 20, low pressure turbine (LPT) 22, fan case 24, LPC case 26, HPC case 28, forward strut 29, HPT case 30, integrated case/stator assembly 31, integrated case/stator segments 32A-32B, shaft 34, shaft 36, exit guide vanes 38, injectors 40, blades 42, support rotor 44, vane airfoil sections 46, case section 48, inlet air A, primary air $A_P$, secondary air $A_S$ (also known as bypass air), and longitudinal engine centerline axis $C_L$.

In the illustrated embodiment, gas turbine engine 10 comprises a dual-spool turbofan engine in which the advantages of the present invention are particularly well illustrated. Gas turbine engine 10, of which the operational principles are well known in the art, comprises fan 12, low pressure compressor (LPC) 14, high pressure compressor (HPC) 16, combustor section 18, high pressure turbine (HPT) 20, and low pressure turbine (LPT) 22, which are each concentrically disposed around longitudinal engine centerline axis $C_L$. Fan 12 is enclosed at its outer diameter within fan case 24. Likewise, the other engine components are correspondingly enclosed at their outer diameters within various engine casings, including LPC case 26, HPC case 28, HPT case 30, and integrated case/stator assembly 31. More specifically, case sections 48 of integrated case/stator segments 32A-32B enclose certain engine components. Fan 12 and LPC 14 are connected to LPT 22 through shaft 34, and together fan 12, LPC 14, LPT 22, and shaft 34 comprise the low pressure spool. HPC 16 is connected to HPT 20 through shaft 36, and together HPC 16, HPT 20, and shaft 36 comprise the high pressure spool.

Inlet air A enters engine 10 where it is divided into streams of primary air $A_P$ and secondary air $A_S$ after passing through fan 12. Fan 12 is rotated by low pressure turbine 22 through shaft 34 (either directly as shown or through a gearbox, not shown) to accelerate secondary air $A_S$ (also known as bypass air) through exit guide vanes 38, thereby producing a major portion of the thrust output of engine 10. Primary air $A_P$ (also known as gas path air) is directed first into low pressure compressor 14 and then into high pressure compressor 16. LPC 14 and HPC 16 work together to incrementally step up the pressure of primary air A. HPC 16 is rotated by HPT 20 through shaft 34 to provide compressed air to combustor section 18. The compressed air is delivered to combustor 18, along with fuel through injectors 40, such that a combustion process can be carried out to produce the high energy gases necessary to turn high pressure turbine 20 and low pressure turbine 22. The latter of which is comprised of blades 42 and vane airfoil sections 46 of integrated case/stator segments 32A-32B. Primary air $A_P$ continues through gas turbine engine 10 whereby it is typically passed through an exhaust nozzle to further produce thrust.

After being compressed in LPC 14 and HPC 16 and participating in a combustion process in combustor 18 (FIG. 1) to increase pressure and energy, primary air $A_P$ flows through HPT 20 and LPT 22 such that blades 42 extract energy from the flow of primary air A. Primary air $A_P$ impinges on blades 42 to cause rotation of support rotor 44 and shaft 34. In order to maintain the efficiency of the combustion process it is necessary to seal the path along which primary air $A_P$ flows. It is particularly advantageous to seal at the ends of vane airfoil sections 46 and blades 42 as they extend from case section 48 and support rotor 44, respectively. For example, in order to maintain the mechanical efficiency of engine 10 it is necessary to ensure that the energy put into primary air $A_P$ translates into useful work of rotating shaft 34. Any air allowed to escape LPT 22 by passing through the gaps at the ends of blades 42 and vane airfoil sections 46 reduces the efficiency of engine 10.

Depicted in FIG. 1 is one embodiment of the present invention, to which there are alternative embodiments. For example, engine 10 can be a three spool engine. In such an embodiment, engine 10 has an intermediate compressor between LPC 14 and HPC 16 and an intermediate turbine between HPT 20 and LPT 22, wherein the intermediate compressor is connected to the intermediate turbine with an additional shaft.

Figure 2:
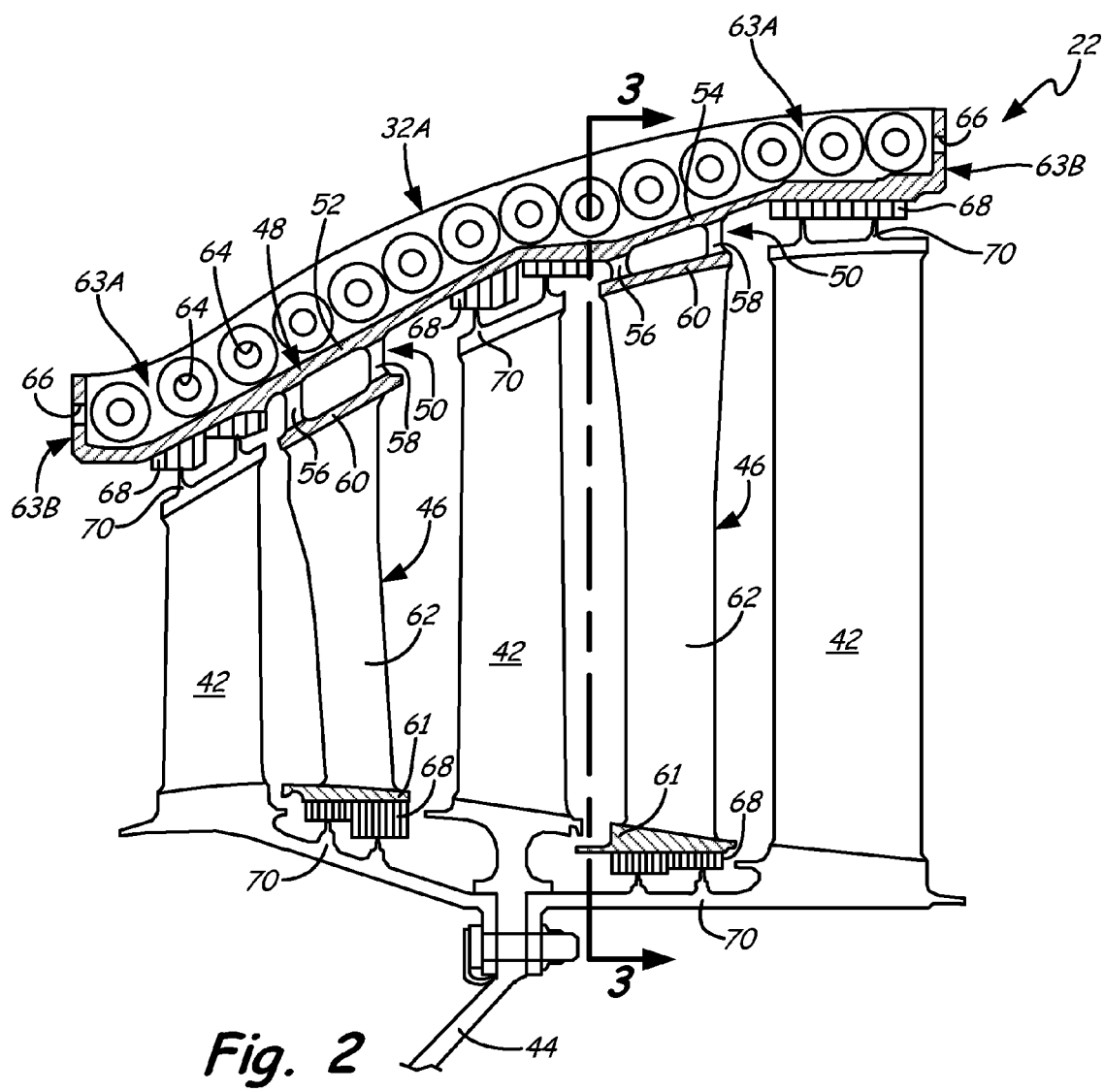
FIG. 2 is a side cross-section view of a low pressure turbine including an integrated case and stator vane component.

In FIG. 2, a cross-section view of LPT 22 is shown including integrated case/stator segment 32A. Shown in FIG. 2 are LPT 22, integrated case/stator segment 32A, blades 42, support rotor 44, vane airfoil sections 46, case section 48, box structure sections 50, first stage 52, second stage 54, first radial supports 56, second radial supports 58, outer rings 60, inner rings 61, vanes 62, mounting flanges 63A-63B, circumferential mounting holes 64, axial mounting hole 66, abradables 68, and knife edge seals 70. While integrated case/stator segments 32A-32B may not be identical, for the present purposes integrated case stator segment 32A represents integrated case/stator segments 32A-32B.

Generally, integrated case/stator segment 32A includes box structure sections 50 and mounting flanges 63A-63B, which extend from case section 48, and vane airfoil sections 46, which extend from box structure sections 50. More specifically, case section 48 is cylindrical about longitudinal engine centerline axis $C_L$ (shown in FIG. 1) and substantially subtends a hemisphere. Extending radially outward from the edges of case section 48 are mounting flanges 63A-63B. Along the axially oriented sections of integrated case/stator segment 32A, mounting flanges 63B have a plurality of circumferential mounting holes 64 along the centerline (also known as the waterline of the engine). Along the circumferentially oriented section of integrated case/stator segment 32A, mounting flange 63A has a plurality of axial mounting holes 66.

Box structure sections 50 extend radially inward from case section 48. In the illustrated embodiment, box structures 50 are arranged circumferentially around case section 48 in two stages: first stage 52 and second stage 54. First stage 52 is axially spaced apart from second stage 54. Each box structure section 50 includes first radial support 56, second radial support 58, and outer ring 60. First radial support 56 and second radial support 58 extend radially inward from case section 48 and are axially spaced apart from one another. Outer ring 60 extends axially between first radial support 56 and second radial support 58 and is radially spaced apart from case section 48. In the illustrated embodiment, outer ring 60 substantially follows the contour of case section 48.

Vane airfoil sections 46 extend radially inward from outer ring 60 of box structure section 50. More specifically, vanes 62 extend radially inward from outer ring 60 and terminate with inner ring 61. The configurations of outer ring 60 and inner ring 61 will be explained later with greater detail in FIGS. 3A-3B.

All together, vane airfoil sections 46, box structure sections 50, case section 48, and mounting flanges 63A-63B comprise a single, unitary integrated case/stator segment 32A. Integrated case/stator segment 32A is comprised of ceramic matrix composite (CMC) material. CMC materials have ceramic fibers embedded in a ceramic matrix, with the ceramic fibers being layed-up prior to the introduction of the matrix material. This allows for the complex shape of integrated case/stator segment 32A to be constructed from CMC fabric material that is bonded to form a unitary structure. Integrated case/stator segment 32A can be comprised of a variety of specific CMC materials, including, but not limited to, silicon-carbide-fiber-reinforced silicon carbide (SiC/SiC) and 5200 silicon carbide ceramic matrix composite. Additionally, after initial construction of integrated case/stator segment 32A with CMC material, features of integrated case/stator segment 32A can be machined to their final shapes and/or coatings can be added to integrated case/stator segment 32A.

Extending radially inward from both case section 48 and vane airfoil sections 46 are abradables 68. Abradables 68 are sacrificial material that interact with knife edge seals 70 at the ends of blades 42 and vane airfoil sections 46 to enhance sealing in LPT 22.

Blades 42 are connected to shaft 34 (shown in FIG. 1) through support rotor 44 such that they rotate during operation of LPT 22. Integrated case/stator segment 32A remains stationary during operation of LPT 22. Therefore, vane airfoil sections 46 remain stationary during operation of LPT 22. As primary air $A_P$ (shown in FIG. 1) expands past vane airfoil sections 46 and is reflected off of blades 42, force is exerted on vane airfoil sections 46. This force is transmitted through box structure sections 50 and dissipated within integrated case/stator segment 32A.

Integrated case/stator assembly 31 (shown in FIG. 1) is separated into two halves along a waterline, as evidenced by mounting flange 63A of integrated case/stator segment 32A. Therefore, in order to install integrated case/stator segment 32A in gas turbine engine 10, integrated case/stator segment 32A is positioned radially around shaft 34 (shown in FIG. 1) such that the two are coaxial (along longitudinal engine centerline axis $C_L$, shown in FIG. 1). Then integrated case/stator segment 32B (shown in FIG. 1) is also positioned radially round shaft 34, opposite of integrated case/stator segment 32A. Integrated case/stator segments 32A-32B are fastened together, forming integrated case/stator assembly 31, by inserting fasteners circumferentially into circumferential mounting holes 64. This encompasses a section of shaft 34. Then integrated case/stator assembly 31 is attached to another portion of gas turbine engine 10, such of HPT case 30 or forward strut 29 (both shown in FIG. 1). Such attachment occurs by inserting fasteners axially into axial mounting holes 66.

The components, configuration, and assembly of LPT 22 as shown in FIG. 2 allow for integrated case/stator segment 32 to be comprised of a single piece of CMC material. Thereby, no heat shields are necessary due to the thermal resistance properties of CMC materials, and abradables 68 can be directly affixed to case section 48. In addition, box structure sections 50 spread the force exerted on vane airfoil sections 46 over a broad area of case section 48, such that vane airfoil sections 46 are not broken by primary air $A_P$ (shown in FIG. 1). Box structure sections 50 can also be relatively short in the radial direction, which minimizes the distance between case section 48 and outer ring 60. In addition, mounting flanges 63A allow for integrated case/stators 32A-32B to be attached circumferentially to each other, and mounting flanges 63B allow for integrated case/stators 32A-32B to be attached axially to other components of gas turbine engine 10 (shown in FIG. 1).

Depicted in FIG. 2 is one embodiment of the invention, to which there are alternatives. For example, integrated case/stator segment 32A can include inserts made of a material other than a CMC material. For instance, the CMC material can be formed around a nickel metal alloy brace in order to strengthen a feature of integrated case/stator segment 32A.

Figure 3A:
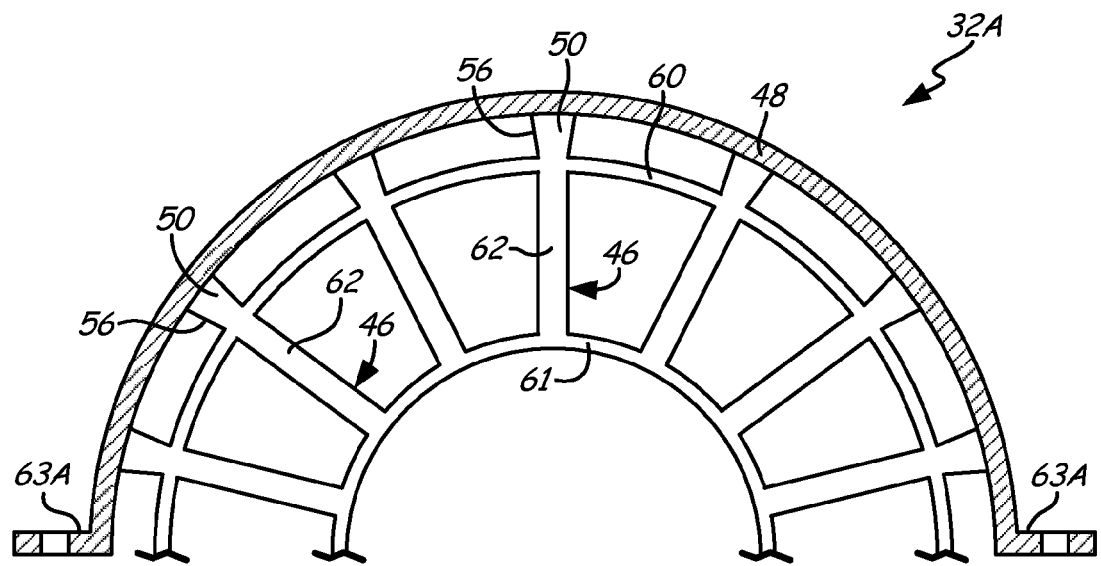
FIG. 3A is a front cross-section view of the integrated case and stator vane component along line 3-3 in FIG. 2.

FIG. 3A is a front cross-section view of integrated case/stator segment 32A along line 3-3 in FIG. 2. Shown in FIG. 3A are integrated case/stator segment 32A, vane airfoil sections 46, case section 48, box structure sections 50, first radial supports 56, outer ring 60, inner ring 61, and vanes 62. As stated previously, while integrated case/stator segments 32A-32B may not be identical, for the present purposes integrated case stator segment 32A represents integrated case/stator segments 32A-32B.

As stated previously, box structure sections 50 extend radially inward from case section 48, with box structure sections 50 being comprised of first radial supports 56, second radial supports 58 (shown in FIG. 2), and outer ring 60. In the illustrated embodiment, first radial supports 56 and second radial supports 58 are circumferentially narrower away from case section 48. Therefore, radial supports 56-58 are substantially trapezoidal in shape. In addition, one pair of radial supports 56-58 are positioned radially outward from where vane 62 extends from outer ring 60.

Outer ring 60 extends circumferentially between pairs of radial supports 56-58. Thereby, outer ring 60 substantially subtends a hemisphere. Similarly, inner ring 61 extends circumferentially between vanes 62 and substantially subtends a hemisphere.

The components and configuration of integrated case/stator segment 32A as shown in FIG. 3A allow for a smoother flow of primary air $A_P$ (shown in FIG. 1) through LPT 22 (shown in FIG. 2). This occurs because outer ring 60 and inner ring 61 direct primary air $A_P$ away from complex features such as box structures 50 and knife edge seals 70 (shown in FIG. 2), respectfully. In addition, when gas turbine engine 10 (shown in FIG. 1) is assembled, integrated case/stator segment 32A only has two radial seals that exist at the waterline of the engine. This minimizes leakage that can decrease engine efficiency.

Figure 3B:
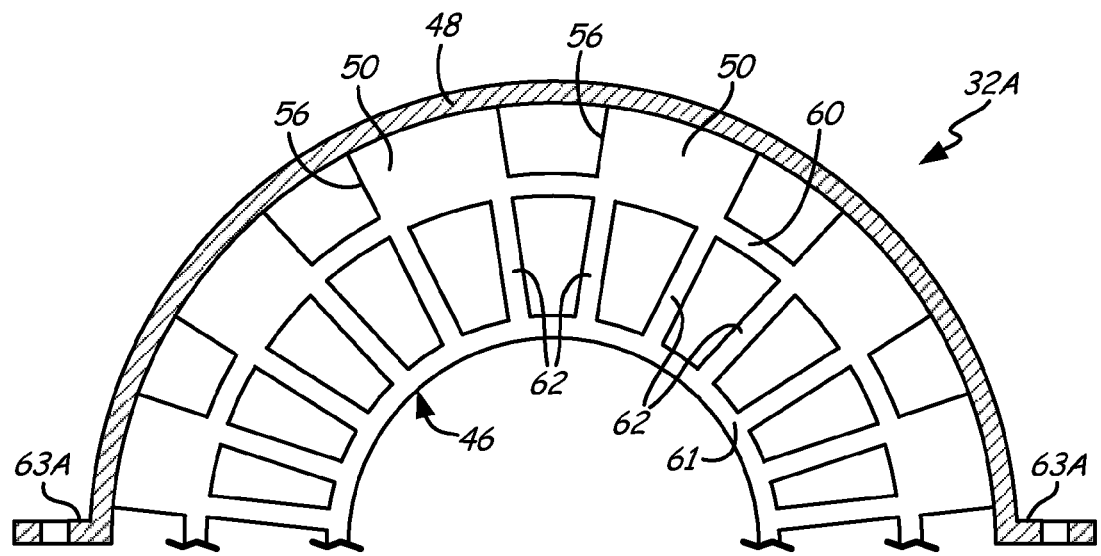
FIG. 3B is a front cross-section view of an alternate embodiment integrated case and stator vane component along line 3-3 in FIG. 2.

FIG. 3B is a front cross-section view of an alternate embodiment integrated case/stator segment 32A along line 3-3 in FIG. 2. Shown in FIG. 3B are integrated case/stator segment 32A, vane airfoil sections 46, case section 48, box structure sections 50, first radial supports 56, outer ring 60, and inner ring 61. As stated previously, while integrated case/stator segments 32A-32B may not be identical, for the present purposes integrated case stator segment 32A represents integrated case/stator segments 32A-32B.

In the illustrated embodiment, first radial supports 56 and second radial supports 58 (shown in FIG. 2) are substantially rectangular in shape because radial supports 56-58 are substantially the same widths along their respective radial lengths. In addition, radial supports 56-58 are positioned radially outward from a plurality of vanes 62.

The components and configuration of alternate embodiment integrated case/stator segment 32A as shown in FIG. 3B allow for use of integrated case/stator segment 32A in smaller engines where vanes 62 are located close to one another.

It should be recognized that the present invention provides numerous benefits and advantages. For example, the use of CMC material for integrated case/stator segment 32A allows for the construction of complex features that may be difficult to make using some traditional methods of manufacturing, such as machining. For another example, the unitary structure of integrated case/stator segment 32A saves weight, in part because the features of integrated case/stator segment 32A are integrated and not held together with fasteners. For a further example, leakage is minimized. This is due in part to outer ring 60 and inner ring 61 substantially preventing gas flow from reaching case section 48. It is also due to the lack of numerous radially separated segments of vane airfoil sections 46.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
   a compressor;
   a combustor section; and
   a turbine, wherein the turbine includes a first integrated case/stator segment that is comprised of a ceramic matrix composite material, the first integrated case/stator segment comprising:
      a first cylindrical case section that is substantially cylindrical about an axis of the gas turbine engine;
      a first box structure section extending radially inward from the first case section, the first box structure section comprising:
         a first radial support and a second radial support, the first and second radial supports extending radially inward and being axially spaced apart from one another; and
         an outer ring that extends between the first and second radial supports and is spaced apart from the case section; and
      a first vane airfoil section extending radially inward from the outer ring, wherein the first case section, the first box structure section, and the first vane airfoil section comprise a single integrated component.

2. The gas turbine of claim 1, wherein the first integrated case/stator segment is a unitary structure.

3. The gas turbine engine of claim 1, wherein the first vane airfoil section comprises:
   a first vane and a second vane, the vanes extending radially inward from the outer ring; and
   an inner ring extending between the first and second vanes, the inner ring being radially spaced apart from the outer ring.

4. The gas turbine engine of claim 1, wherein the integrated case/stator segment includes metallic reinforcing material in addition to the ceramic matrix composite material.

5. The gas turbine of claim 1, wherein the first integrated case/stator segment is axially fastened to the engine case.

6. The gas turbine of claim 1, wherein the first integrated case/stator segment is half of an annulus.

7. The gas turbine of claim 6, and further comprising:

a second integrated case/stator segment that completes another half of the annulus and is circumferentially fastened to the first integrated case/stator segment to form an integrated case/stator assembly.

8. The gas turbine of claim 1, and further comprising:
   a plurality of rotor blades connected to the low pressure shaft; and
   an abradable material attached to the first integrated case/stator segment and extending radially inward from the first case section.

9. An integrated case/stator segment for a gas turbine engine, the integrated case/stator segment comprising:
   a first cylindrical case section that is curved about an axis;
   a first box structure section extending radially inward from the first case section, the first box structure section comprising:
      a first radial support and a second radial support, the first and second radial supports extending radially inward and being axially spaced apart from one another; and
      an outer ring that extends between the first and second radial supports and is spaced apart from the case section; and
   a first vane airfoil section extending radially inward from the outer ring of the first box structure, wherein the first case section, the first box structure section, and the first vane airfoil section comprise a single integrated component.

10. The integrated case/stator segment of claim 9, wherein the first vane airfoil section comprises:
    a first vane and a second vane, the vanes extending radially inward from the outer ring; and
    an inner ring extending between the first and second vanes, the inner ring being radially spaced apart from the outer ring.

11. The integrated case/stator segment of claim 9, and further comprising:
    a second box structure extending radially inward from the first case section, the second box structure being axially spaced from the first box structure; and
    a second vane airfoil section extending radially inward from the second box structure.

12. The integrated case/stator segment of claim 9, wherein the integrated case/stator segment is comprised of a ceramic matrix composite material.

13. The integrated case/stator segment of claim 12, wherein the integrated case/stator segment includes metallic reinforcing material in addition to the ceramic matrix composite material.

14. The integrated case/stator segment of claim 9, wherein the first case section is half of an annulus.

15. The integrated case/stator segment of claim 9, and further comprising:
    an abradable material attached to the integrated case/stator segment and extending radially inward from the first case section.

16. An integrated case/stator assembly for a gas turbine engine, the integrated case/stator assembly comprising:
    a first integrated case/stator segment, the first integrated case/stator segment being comprised of a ceramic matrix composite material; and
    a second integrated case/stator segment, the second integrated case/stator segment being comprised of a ceramic matrix composite material, wherein the second integrated case/stator segment is attached to the first integrated case/stator segment, and wherein the first and second integrated case/stator segments together form an annulus.

17. The integrated case/stator assembly of claim 16, wherein the first and second integrated case/stator segments are circumferentially attached to each other.

18. The integrated case/stator assembly of claim 16, wherein the first integrated case/stator segment comprises:
    a first cylindrical case section that is curved about an axis of the gas turbine engine;
    a first box structure section extending radially inward from the first case section, the first box structure section comprising:
       a first radial support and a second radial support, the first and second radial supports extending radially inward and being axially spaced apart from one another; and
       an outer ring that extends between the first and second radial supports and is spaced apart from the case section; and
    a first vane airfoil section extending radially inward from the outer ring, wherein the first case section, the first box structure section, and the first vane airfoil section comprise a single integrated component.

* * * * *

UNITED STATES PATENT AND TRADEMARK OFFICE
CERTIFICATE OF CORRECTION

PATENT NO. : 9,039,364 B2
APPLICATION NO. : 13/172316
DATED : May 26, 2015
INVENTOR(S) : Ioannis Alvanos and Gabriel L. Suciu Page 1 of 1

It is certified that error appears in the above-identified patent and that said Letters Patent is hereby corrected as shown below:

Specification

Col. 4, Line 18, delete "5200", and insert -- S200 --.

Signed and Sealed this
Fifteenth Day of September, 2015

Michelle K. Lee
*Director of the United States Patent and Trademark Office*